(12) United States Patent
Bolz et al.

(10) Patent No.: US 7,272,303 B2
(45) Date of Patent: Sep. 18, 2007

(54) METHOD AND CONTROL CIRCUIT FOR DRIVING AN ELECTRIC MOTOR OF A SEATBELT RETRACTOR

(75) Inventors: Michael Bolz, Welzheim (DE); Martin Prokscha, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 0 days.

(21) Appl. No.: 11/242,308

(22) Filed: Oct. 3, 2005

(65) Prior Publication Data

US 2006/0072911 A1  Apr. 6, 2006

(30) Foreign Application Priority Data

Oct. 4, 2004  (DE) .................. 10 2004 048 258

(51) Int. Cl.
*H02P 7/06* (2006.01)

(52) U.S. Cl. .................. 388/803; 318/138; 318/254; 318/439; 388/800; 388/801; 388/802; 388/816

(58) Field of Classification Search ................ 318/138, 318/254, 439, 599; 388/800–803, 816
See application file for complete search history.

(56) References Cited

U.S. PATENT DOCUMENTS

| | | | | |
|---|---|---|---|---|
| 4,775,939 A * | 10/1988 | Nakashima et al. | .......... | 701/49 |
| 4,794,312 A | 12/1988 | Kano et al. | | |
| 4,922,426 A * | 5/1990 | Obara et al. | .................. | 701/49 |
| 5,015,933 A * | 5/1991 | Watkins et al. | ............. | 318/567 |
| 5,596,497 A * | 1/1997 | Honda | .......................... | 701/45 |
| 5,959,419 A * | 9/1999 | Sugiyama | .................... | 318/293 |
| 6,072,246 A | 6/2000 | Schafer | | |
| 6,595,453 B2 | 7/2003 | Durrstein et al. | | |
| 6,997,277 B2 * | 2/2006 | Midorikawa et al. | ........ | 180/268 |
| 7,003,385 B2 * | 2/2006 | Bolz et al. | .................... | 701/45 |

FOREIGN PATENT DOCUMENTS

| | | |
|---|---|---|
| DE | 3841938 | 12/1990 |
| DE | 3732813 | 6/1993 |
| DE | 4141093 | 6/1993 |
| DE | 4416509 | 11/1995 |

(Continued)

*Primary Examiner*—Lincoln Donovan
*Assistant Examiner*—Tyrone Smith
(74) *Attorney, Agent, or Firm*—Tarolli, Sundheim, Covell & Tummino LLP

(57) ABSTRACT

An electric motor drives a belt spool of a seatbelt retractor in a vehicle using a micro-controller and a drive circuit that drives the electric motor. A plurality of PWM control signal sources are provided each of which has a trigger input and a control signal output. Each control signal source, upon application of a trigger pulse to its trigger input, provides on its control signal output a control pulse of a duration different from durations of control pulses of all other control signal sources. A set of motor control programs are permanently stored in the micro-controller. A program selection signal is sent to the micro-controller from a central sensor unit in the vehicle. Trigger pulses are sent by the micro-controller to the trigger inputs of the control signal sources. Particular ones of the control signal sources are selected for application of their signal outputs to the drive circuit in a control sequence defined by a selected control program.

9 Claims, 4 Drawing Sheets

FOREIGN PATENT DOCUMENTS

Figure 1:
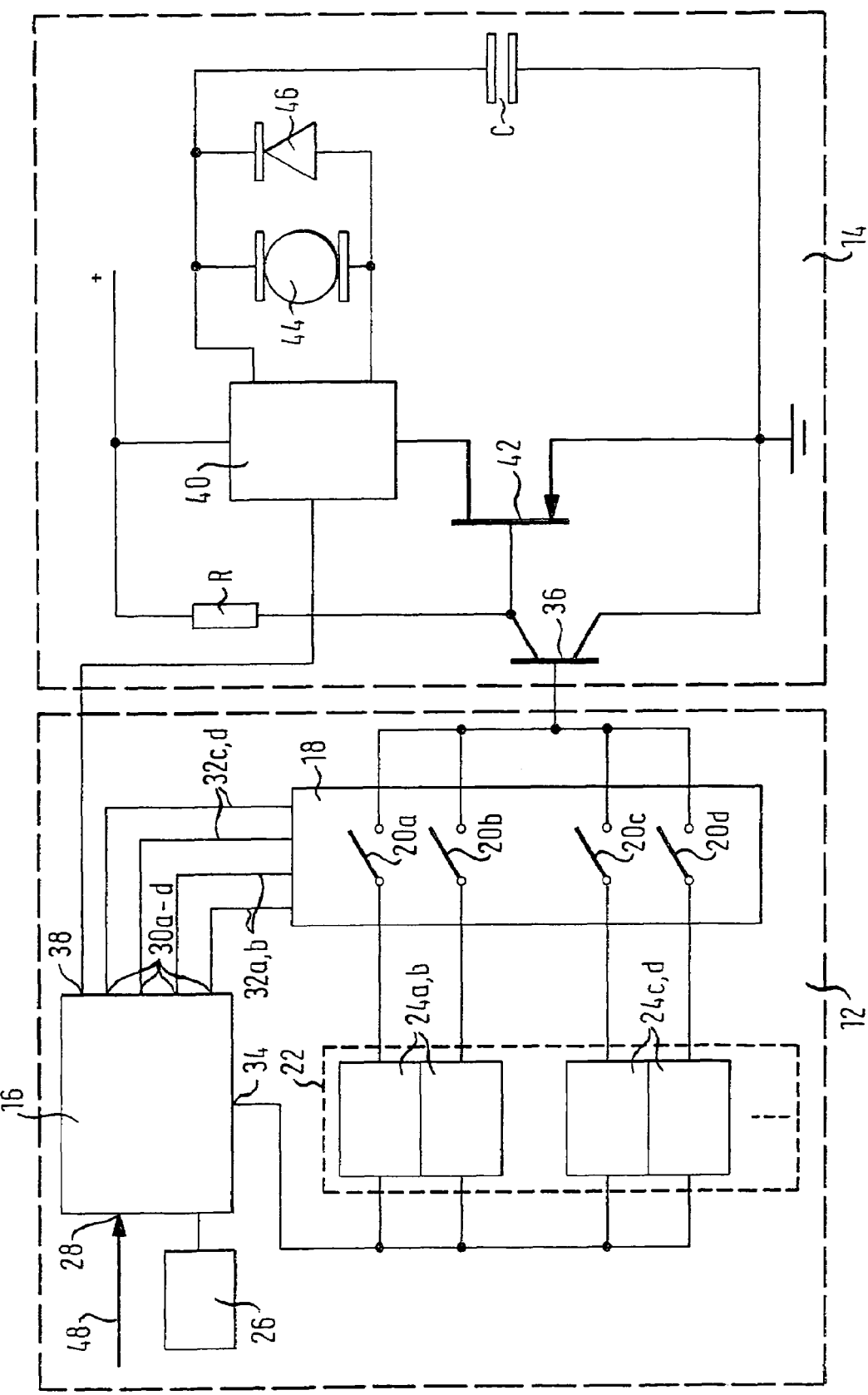

| | | |
|---|---|---|
| DE | 19267877 | 1/1998 |
| DE | 19915876 | 1/2001 |
| DE | 10025611 | 11/2001 |
| DE | 19651062 | 7/2003 |
| JP | 05328789 | 12/1993 |

* cited by examiner

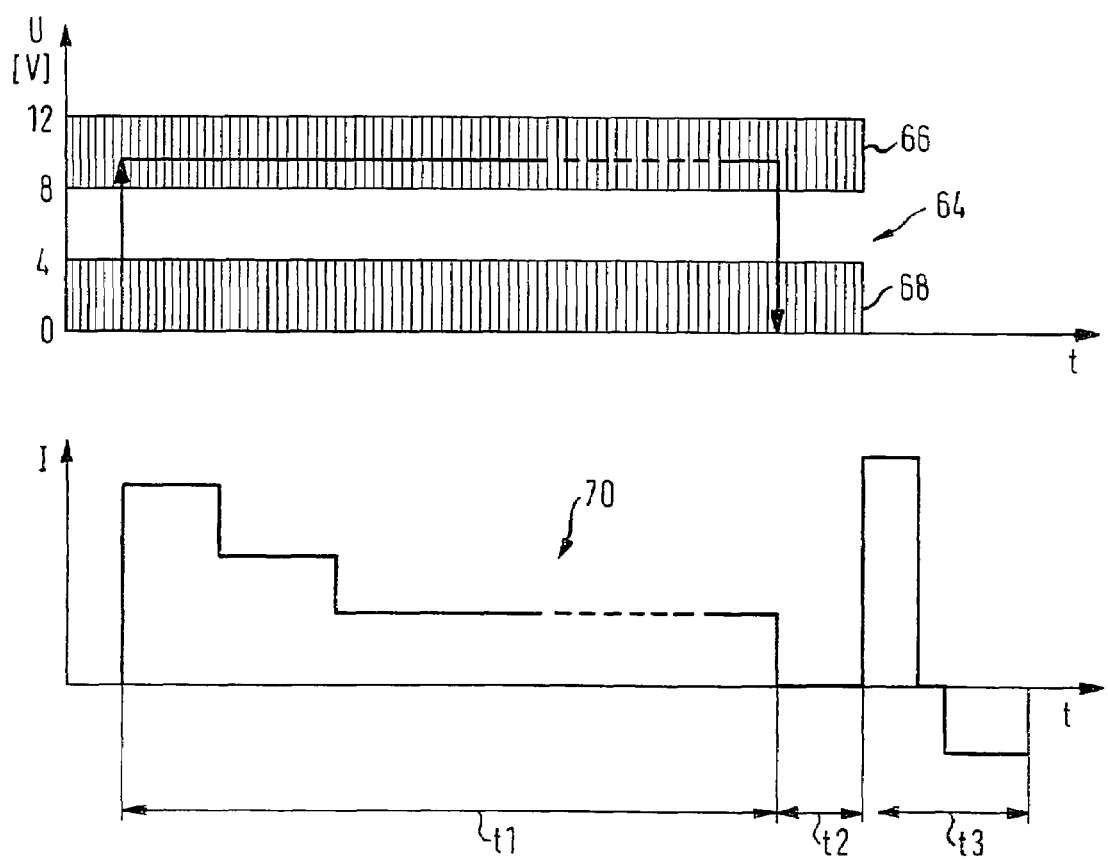

METHOD AND CONTROL CIRCUIT FOR DRIVING AN ELECTRIC MOTOR OF A SEATBELT RETRACTOR

The present invention relates to a method and to a control circuit for driving an electric motor that drives a belt spool of a seatbelt retractor in a vehicle.

In seatbelt retractors, a locking mechanism has to be activated on the basis of predefined criteria, which are specified either by the automobile manufacturer or by statutory regulations. Modern seatbelt retractors, in addition to the locking functions, are also provided with other safety functions as well as with comfort functions. The safety functions include, for example, the tensioning of the seatbelt in a pre-crash phase, and the comfort functions include loosening of the seatbelt after it has been buckled and after the belt slack has been eliminated. The implementation of these functions normally requires a processor where control algorithms, diagnostic routines and the like are stored. A complex electronic equipment is needed for each of the, for example, four or five seatbelt retractors that are installed in the vehicle.

The present invention provides a method and control circuit permitting a large variety of safety and comfort functions to be attained with a simple and inexpensive micro-controller and only a few added electronic components of a basic nature.

Specifically, the invention provides a method of controlling an electric motor that drives a belt spool of a seatbelt retractor in a vehicle using a micro-controller and a drive circuit that drives the electric motor. A plurality of PWM control signal sources are provided each of which has a trigger input and a control signal output, each control signal source, upon application of a trigger pulse to its trigger input, providing on its control signal output a control pulse of a duration different from durations of control pulses of all other control signal sources. A set of motor control programs is permanently stored in the micro-controller. A program selection signal is sent to said micro-controller from a sensor unit in the vehicle.

Trigger pulses are applied to the trigger inputs of the control signal sources from the micro-controller. Particular ones of the control signal sources are selected for application of their signal outputs to the drive circuit in a control sequence defined by a selected control program. With this method a large variety of control strategies for the electric motor can be implemented without the need for high hardware performance and sophisticated control algorithms.

In a preferred embodiment, a particular control sequence defines the number of successive trigger pulses in each section of the sequence associated with one of the control signal sources. This is a simple way to define the duration for a particular torque to be developed by the electric motor in a particular operation of the seat belt retractor.

In some cases, reverse rotation of the electric motor is required. In another preferred embodiment, the micro-controller provides a directional control signal for application to the drive circuit and the directional control signal is defined by a currently selected motor control program.

To increase the flexibility and performance of the method without adding any hardware requirements, the motor control programs can be chained.

The invention also provides a control circuit for driving an electric motor that drives a belt spool of a seatbelt retractor in a vehicle equipped with a central sensor unit. The control circuit comprises a drive circuit with a control input for driving the electric motor. The control circuit also comprises a micro-controller with a sensor input connected to the central sensor unit and a trigger signal output, the micro-controller having a set of motor control programs permanently stored in a memory and the central sensor unit providing selection control signals to the micro-controller for selecting one out of the set of motor control programs at a time. In addition, the control circuit comprises a plurality of PWM control signal sources each of which has a trigger input connected to the trigger signal output of the micro-controller and a control signal output, each control signal source, upon application of a trigger pulse to its trigger input, providing on its control signal output a control pulse of a duration different from durations of control pulses of all other control signal sources. A switching unit controlled by the micro-controller selectively connects the control signal output of one of the PWM control signal sources with the control input of the drive circuit in accordance with a selected motor control program. The trigger signal output of the micro-processor provides a sequence of periodic signal pulses, preferably short pulses with a duty cycle of e.g. 1:20. In the preferred embodiment, each PWM signal source is formed by a mono-stable toggle circuit and a gate circuit, the toggle circuit having a trigger input connected to the trigger signal output of the micro-controller and an output, and the gate circuit having a first input connected to the output of the toggle circuit, a second input connected to the trigger signal output of the micro-controller and an output connected to the control input of the drive circuit. Accordingly, only a few standard components are required to implement the control circuit.

In an embodiment where reverse rotation of the electric motor is required, a relay is provided for inverting the polarity of drive current supplied to the electric motor under control of the micro-controller.

Figure 2:
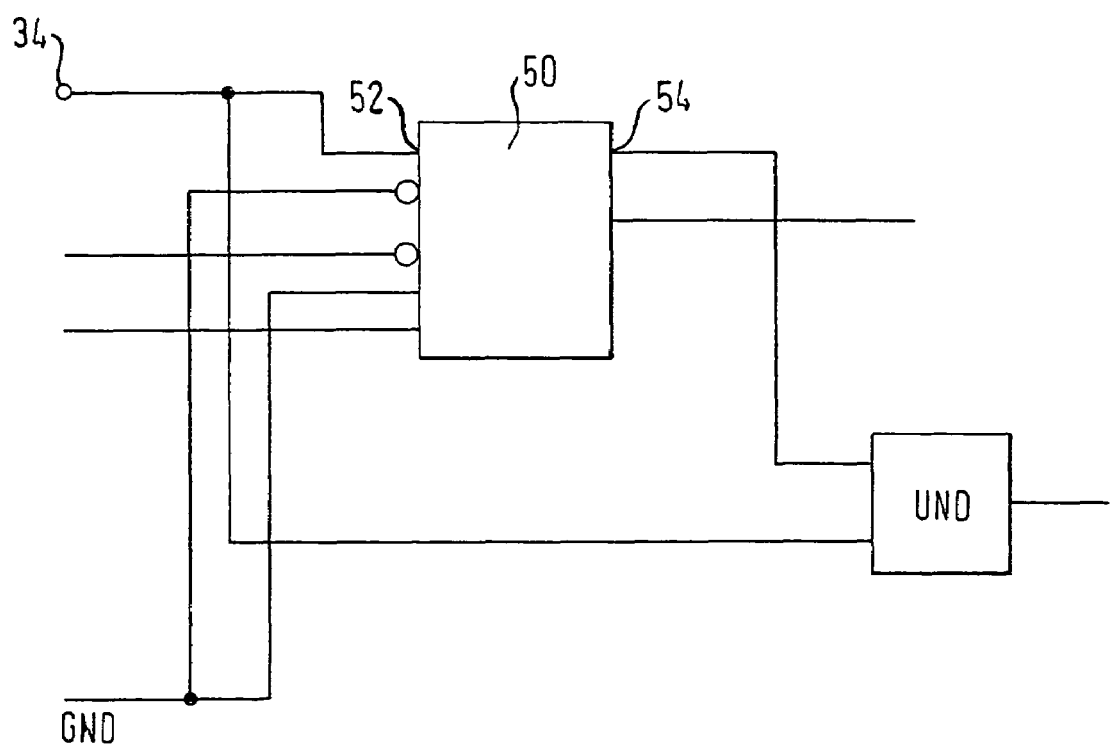
Figure 3:
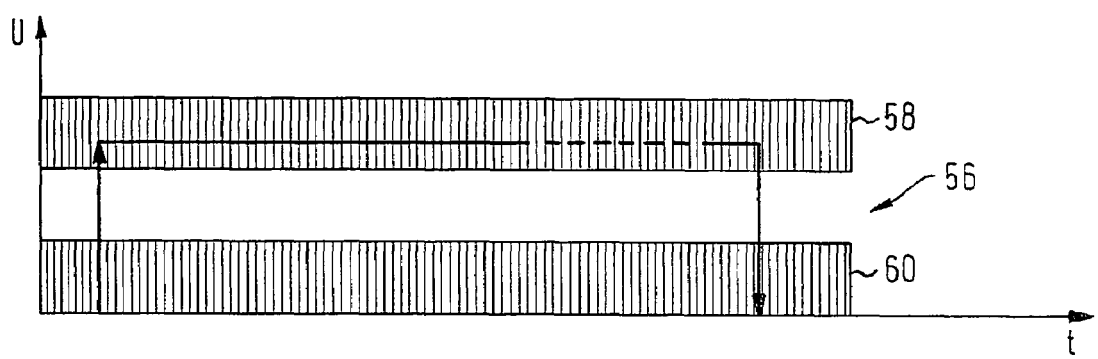
Figure 3:
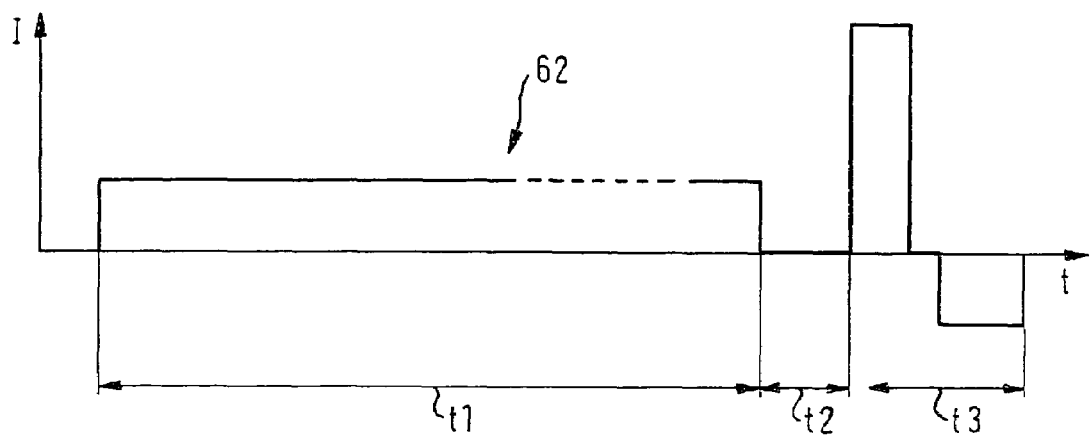

Additional advantages and features of the invention ensue from the accompanying claims and from the description below with reference to the drawings. The drawings show the following:

FIG. 1 a block diagram of circuitry with which the method according to the invention can be implemented;

FIG. 2 components of a PWM signal source;

FIG. 3 timing diagrams for driving the electric motor according to a first driving program; and FIG. 4 timing diagrams for driving the electric motor according to another driving program.

The block diagram of FIG. 1 shows that the circuitry for carrying out the method comprises two major function blocks: a control unit 12 and a power stage 14. The control unit 12 encompasses a micro-controller 16, a sequence switch block 18 with switches 20*a-d*, a PWM block 22 with PWM signal sources 24*a-d* as well as a watchdog module 26. The micro-controller 16 has an input 28 that—via a CAN-bus of the vehicle in which the method is to be implemented—is connected to a central sensor unit installed in the vehicle. Four control outputs 30*a-d* of the micro-controller 16 are connected to four inputs of the sequence switch block 18 via control lines 32*a-d* and are each associated with one of the switches 20*a-d*. A PWM trigger output 34 of the micro-controller 16 is connected to associated inputs of the PWM signal sources 24*a-d*. The outputs of the PWM signal sources 24*a-d* are selectively connected to the base of a driving transistor 36 of the power stage 14 by an activated switch 20*a-d*. An output 38 of the micro-controller 16 is connected to a control input of a relay 40 in the power stage. Moreover, the micro-controller 16 is connected to the watchdog module 26. The driving of an electric motor for the belt spool of a seatbelt retractor is a critical process in terms of the safety of the vehicle occupants. Consequently, the watch-dog module 26 constantly monitors the operational readiness of the micro-controller.

In addition to the driving transistor 36 and the relay 40, the power stage 14 comprises a MOS power transistor 42, an electric motor 44 that drives a belt spool of a seatbelt retractor (not shown), a reverse biased diode 46 as well as a capacitor C and a resistor R. Via the resistor R, the emitter-collector path of the driving transistor 36 is connected between a positive supply voltage and ground. The collector of the driving transistor 36 is connected to the gate of the MOS power transistor 42. The source of the MOS power transistor 42 is connected to ground while the drain is connected to a switching input of the relay 40. Another switching input of the relay 40 is connected to the positive voltage supply. The electric motor 44 is connected between two outputs of the relay 40. By means of the relay 40, the polarity of the electric motor is reversed in order to change its rotational direction. Protective diode 46 is connected in parallel to the electric motor 44. The capacitor C is connected between the electric motor 44 and the ground. The capacitor C serves as a buffer capacitor.

In operation, the central sensor unit supplies a program selection signal on line 48. The program selection signal is computed by means of an algorithm so as to process sensor data with vehicle-relevant values such as, for example, vertical and horizontal acceleration, wheel rotational speed or information from the on-board radar. The program selection signal on line 48 is received at the input 28 of the micro-controller. In the described embodiment, line 48 is a CAN-bus. As an alternative, program selection signals are transmitted via separate lines. In each case, the program selection signal calls a particular driving program stored within the micro-controller. According to a sequence that is specified in the program, the micro-controller sends control signals on control lines 32a-d to the switches 20a-d in the sequence switch block 18. Each of the control lines 32a-d is associated with one of the switches 20a-d. A control signal ensures that the associated switch 20a-d is closed. At the same time, the micro-controller 16 emits periodic PWM trigger pulses on output 34.

In the embodiment according to FIG. 1, the PWM block 22 comprises four different PWM signal sources 24a-d. Depending on the configuration, more or fewer PWM signal sources can be provided. Each of the PWM signal sources 24a-d supplies at its output a pulse-width modulated signal having a fixed pulse duty ratio. Different PWM signal sources have different pulse duty ratios. The pulse-width modulated signals are triggered by the microcontroller 16 on its output 34. The mode of operation of the PWM signal sources 24a-d is explained below with reference to FIG. 2.

If a selected driving program triggers, for example, a control signal at the control output 30a for a certain time duration T, then the switch 20a, which is connected to the control output 30a via the control line 32a, is closed during this time T. The PWM signal that is supplied by the PWM signal source 24a at its output is thus present during the time duration T at the base of the driving transistor 36. The latter switches the electric motor 44 on via the MOS power transistor 42 and the relay 40. Each pulse duty ratio of a PWM signal corresponds to a fixed current level. Thus, in the electric motor 44, a current flow is generated that corresponds to a specific motor torque. Depending on the pulse duty ratio of the PWM signal, the electric motor then generates a specific torque. After the time duration T, the driving program ensures that no control signal is present any longer at the output 30a and the switch 20a opens. Instead, a control signal, for example, is now present at the output 30d, and the switch 20d is closed. Therefore, the electric motor 44 is driven by the PWM signal that is supplied by the PWM signal source 24d and that has a different pulse duty ratio. Consequently, the electric motor 44 generates a different torque value.

In addition to the trigger signal at the output 34 and the control signals for driving the switches 20a-d in the sequence switch block 18, the micro-controller 16 also provides a directional signal at the output 38. The directional signal is also determined by the selected driving program. This directional signal, which is applied to the relay 40, determines the rotational direction of the electric motor.

FIG. 2 shows the essential components of a PWM signal source 24a-d, namely, a mono-stable toggle circuit 50 and an AND gate. The trigger signal at the output 34 of the micro-controller is present at a triggering input 52 of the circuit 50 and triggers a fixed one-shot duration. The output 54 of circuit 50 is applied to a first input of the AND gate, a second input of which is connected to output 34 of the micro-controller.

Each mono-stable toggle circuit 50 of a PWM signal source 24a-d is set for a different fixed time constant. Therefore, depending on the time constant, each PWM signal source 24a-d has a different PWM pulse duty ratio at its output 54.

The PWM trigger signal is present at one input of the AND gate and the output at 54 of the circuit 50 is present at the other input. If the duty cycle of the PWM trigger signal exceeds the time constant of the toggle circuit, then the subsequent logical addition in the AND gate of the PWM trigger signal and of the output signal at output 54 yields a logical zero at the output of the AND gate, which constitutes the output signal of the PWM signal source 24a-d. Hence, the PWM block 22 in FIG. 1 can ensure that, even in case of an erroneous driving program in the micro-controller 16, only fixed, pre-selected PWM pulse duty ratios are forwarded via the sequence switch block 18. If the time-related duty cycle of the PWM trigger signal is greater than the time constant of the toggle circuit, no effective signal will reach the sequence switch block 18.

The method according to the invention will now be explained in greater depth on the basis of FIG. 3. A first diagram 56 in FIG. 3 schematically shows the time duration of a selection signal at line 48 that is applied to the micro-controller 16. A voltage U is plotted on the y-axis and a time t is plotted on the x-axis. The trigger signal at line 34 only distinguishes between two states. If the voltage level is in an upper crosshatched area 58, then a driving program in the micro-controller is requested or an already-started sequence continues to run. If the voltage level is in a lower crosshatched area 60, then either the sequence requested by the driving program is ended or else no driving program is loaded.

The evolution of the current level fed into the electric motor 44 via the relay 40 is shown in a second diagram 62 of FIG. 3. Whereas the time t is once again plotted on the x-axis, now the current level I is plotted on the y-axis. In FIG. 3, it is assumed that the depicted selection signal selects the "buckling up" comfort function, that is to say, the process of buckling up is assisted by the motor; to put it more precisely, after the buckling up, the belt slack is eliminated and the seatbelt is gently tensioned. This only requires one current level, that is to say, only one of the PWM signal sources 24a-d from the PWM block 22. The tensioning is ended after the time t1. In the preferred embodiment shown here, a delay time t2 starts with the transition of the triggering signal from the high level to the low level, and another driving program is requested after this delay time t2 has ended. The time duration t3 of this additional driving program is predetermined; no triggering signal is needed at the input of the micro-controller during this driving program. This driving program, also referred to as a release cycle, is made up of a short, strong tensioning of the seatbelt and of a brief change in the direction of the electric motor in order to generate a brief restoring pulse. This release cycle makes it possible to prevent the seatbelt retractor from remaining in a locked state. As can be seen in the diagram 62, two different current levels and the directional signal emitted by the micro-controller 16 are needed for this cycle.

FIG. 4 shows the sequence when another driving program is requested. Diagram 64 shows the selection signal at line 48. The y-axis is labeled here with voltage values in volts, and the x-axis again shows the time t. Since the battery of a vehicle supplies a voltage of 12 volts, an upper crosshatched area 66, which lies between about 8 volts and 12 volts, and a lower crosshatched area 68, which lies between 0 volts and 4 volts, are used. The sequence of a driving program shown in the diagram 70 shows a pre-crash driving program. In this case, the processing of an algorithm in the central sensor unit indicates an imminent collision. The electric motor 44 is operated at a high current level at first, that is to say, the seatbelt is tensioned rapidly, and then the motor torque is reduced step-wise. Thus, in the case of the driving program for the pre-crash phase, three PWM signal sources 24a-c are needed in the PWM block 22 of FIG. 1 and correspondingly, three switches 20a-c—which are each closed one at a time—are needed in the sequence switch block 18. Also in the case of the driving program for the pre-crash phase, after a delay time t2, the release cycle driving program is called which, in turn, takes the time t3.

The method was explained with reference to two particular driving programs; other driving programs with a different, for example, finer, gradation of the available current levels are envisaged within the scope of the invention.

The invention claimed is:

1. A method of controlling an electric motor that drives a belt spool of a seatbelt retractor in a vehicle using a micro-controller and a drive circuit that drives the electric motor, comprising the steps of:
    (a) providing a plurality of PWM control signal sources each of which has a trigger input and a PWM control signal output, each PWM control signal source, upon application of a trigger pulse to its trigger input, providing on its PWM control signal output a PWM control pulse of a predetermined duration different from predetermined durations of PWM control pulses of all other PWM control signal sources, each PWM control signal source corresponding to a specific torque of the electric motor;
    (b) providing a set of motor control programs permanently stored in the micro-controller;
    (c) providing a program selection signal to said micro-controller from a sensor unit in the vehicle;
    (d) applying trigger pulses to the trigger inputs of said PWM control signal sources from said micro-controller; and
    (e) selecting particular ones of said PWM control signal sources for application of their PWM signal outputs to said drive circuit, thus selecting specific torques of the electric motor in a control sequence defined by a selected control program.

2. The method according to claim 1, wherein said control sequence defines the number of successive trigger pulses in each section of the sequence associated with one of the PWM control signal sources.

3. The method according to claim 1, wherein the micro-controller provides a directional control signal for application to the drive circuit and the directional control signal is defined by a currently selected motor control program.

4. The method according to claim 1, including the step of chaining at least two motor control programs in said set of motor control programs.

5. A control circuit for driving an electric motor that drives a belt spool of a seat-belt retractor in a vehicle equipped with a central sensor unit, comprising
    a drive circuit with a PWM control input for driving the electric motor with a specific torque depending on a PWM control signal applied to said PWM control input;
    a micro-controller with a sensor input connected to the central sensor unit and a trigger signal output, the micro-controller having a set of motor control programs permanently stored in a memory and the central sensor unit providing selection control signals to the micro-controller for selecting one out of the set of motor control programs at a time;
    a plurality of PWM control signal sources each of which has a trigger input connected to the trigger signal output of the micro-controller and a PWM control signal output, each PWM control signal source, upon application of a trigger pulse to its trigger input, providing on its PWM control signal output a PWM control pulse of a predetermined duration different from predetermined durations of PWM control pulses of all other PWM control signal sources, each PWM control signal source corresponding to a specific torque of the electric motor;
    and a switching unit controlled by the micro-controller to selectively connect the PWM control signal output of one of the PWM control signal sources with the PWM control input of the drive circuit in accordance with a selected motor control program.

6. The control circuit according to claim 5, wherein the trigger signal output of the micro-controller provides a sequence of periodic signal pulses.

7. The control circuit according to claim 5, wherein each PWM signal source is formed by a mono-stable toggle circuit and a gate circuit, the toggle circuit having a trigger input connected to the trigger signal output of the micro-controller and an output, and the gate circuit having a first input connected to the output of the toggle circuit, a second input connected to the trigger signal output of the micro-controller and an output connected to the PWM control input of the drive circuit.

8. The control circuit according to claim 7, wherein the gate circuit is an AND gate.

9. The control circuit according to claim 5, comprising a relay for inverting the polarity of drive current supplied to the electric motor under control of the micro-controller.

* * * * *